(12) United States Patent
Dec et al.

(10) Patent No.: US 8,400,943 B2
(45) Date of Patent: Mar. 19, 2013

(54) IPV6 ADDRESSING OVER NON-IPV6 SYSTEMS

(75) Inventors: Wojciech Dec, Amsterdam (NL); William Mark Townsley, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 12/369,436

(22) Filed: Feb. 11, 2009

(65) Prior Publication Data
US 2010/0202321 A1 Aug. 12, 2010

(51) Int. Cl.
*H04L 12/28* (2006.01)
*H04J 3/16* (2006.01)

(52) U.S. Cl. .......................... 370/254; 370/466; 370/467

(58) Field of Classification Search .................. None
See application file for complete search history.

(56) References Cited

U.S. PATENT DOCUMENTS

| | | | | |
|---|---|---|---|---|
| 2004/0246991 | A1* | 12/2004 | Tsuzuki et al. | 370/466 |
| 2005/0027834 | A1* | 2/2005 | Chen et al. | 709/222 |
| 2005/0238009 | A1* | 10/2005 | Bell | 370/389 |
| 2009/0165091 | A1* | 6/2009 | Liang | 726/3 |
| 2010/0118869 | A1* | 5/2010 | Li et al. | 370/389 |
| 2010/0202459 | A1* | 8/2010 | Tsuchiya et al. | 370/392 |

OTHER PUBLICATIONS

Juniper Networks, Inc., Using PPPoE and IPoE in Ethernet Broadband Networks, Jan. 2008, White Paper, pp. 1-15.*
Juniper Networks, Inc., Understanding PPPoE and DHCP, May 2006, White Paper, pp. 1-15.*
Varga, B. et al., IPv6 System Architecture, IPv6 Address Assignment for IPoE Connections, pp. 1-17, Feb. 2, 2009.
Miles, D. et al., Lightweight DHCPv6 Relay Agent, Oct. 13, 2009, pp. 1-16, available at http://tools.ietf.org/html/draft-ietf-dhc-dhcpv6-ldra-01 on Feb. 22, 2010.
Miles, D. et al., Lightweight DHCPv6 Relay Agent (LDRA), May 2008, pp. 1-16, available at http://tools.ietf.org/html/draft-miles-dhc-dhcpv6-ldra-00 on Feb. 22, 2010.
Droms, R. et al., Dynamic Host Configuration Protocol for IPv6 (DHCPv6), Jul. 2003, pp. 1-95, available at http://www.ietf.org/rfc/rfc3315.txt on Feb. 22, 2010.

* cited by examiner

*Primary Examiner* — Chirag Shah
*Assistant Examiner* — Srinivasa Reddivalam
(74) *Attorney, Agent, or Firm* — Brinks Hofer Gilson & Lione

(57) ABSTRACT

A system includes an access node having an associated identifier. The access node is configured to insert the identifier into a network connection request. The system includes an IP edge service node connected to the access node and configured to receive the network connection request. The IP edge service node is further configured to store the inserted identifier and to insert the identifier into an Internet protocol version 6 (IPv6) address request transmitted according to dynamic host configuration protocol version 6 (DHCPv6) through an established network connection based on the network connection request. The system further includes a server configured to receive the IPv6 address request and assign an IPv6 address based on the IPv6 address request.

21 Claims, 5 Drawing Sheets

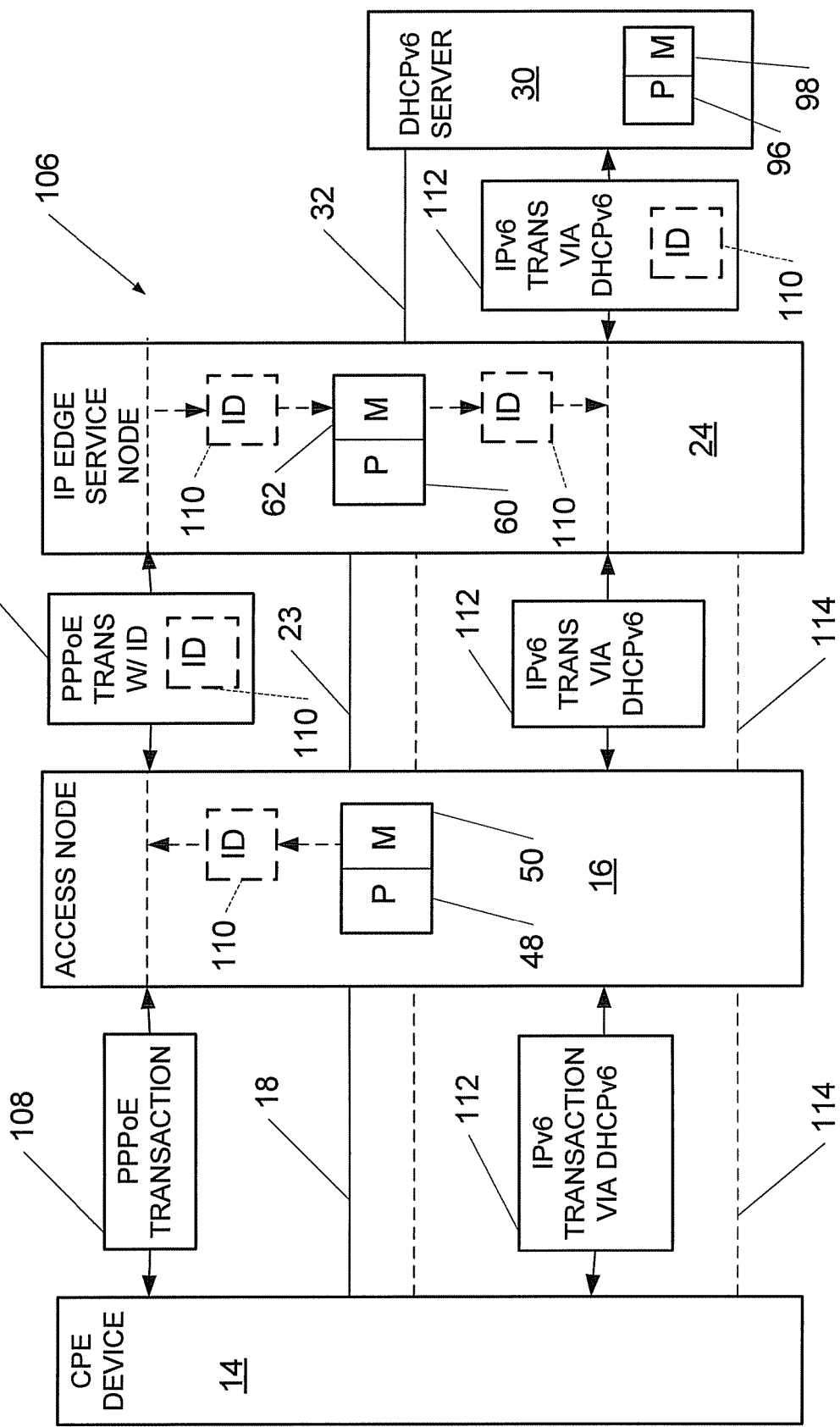

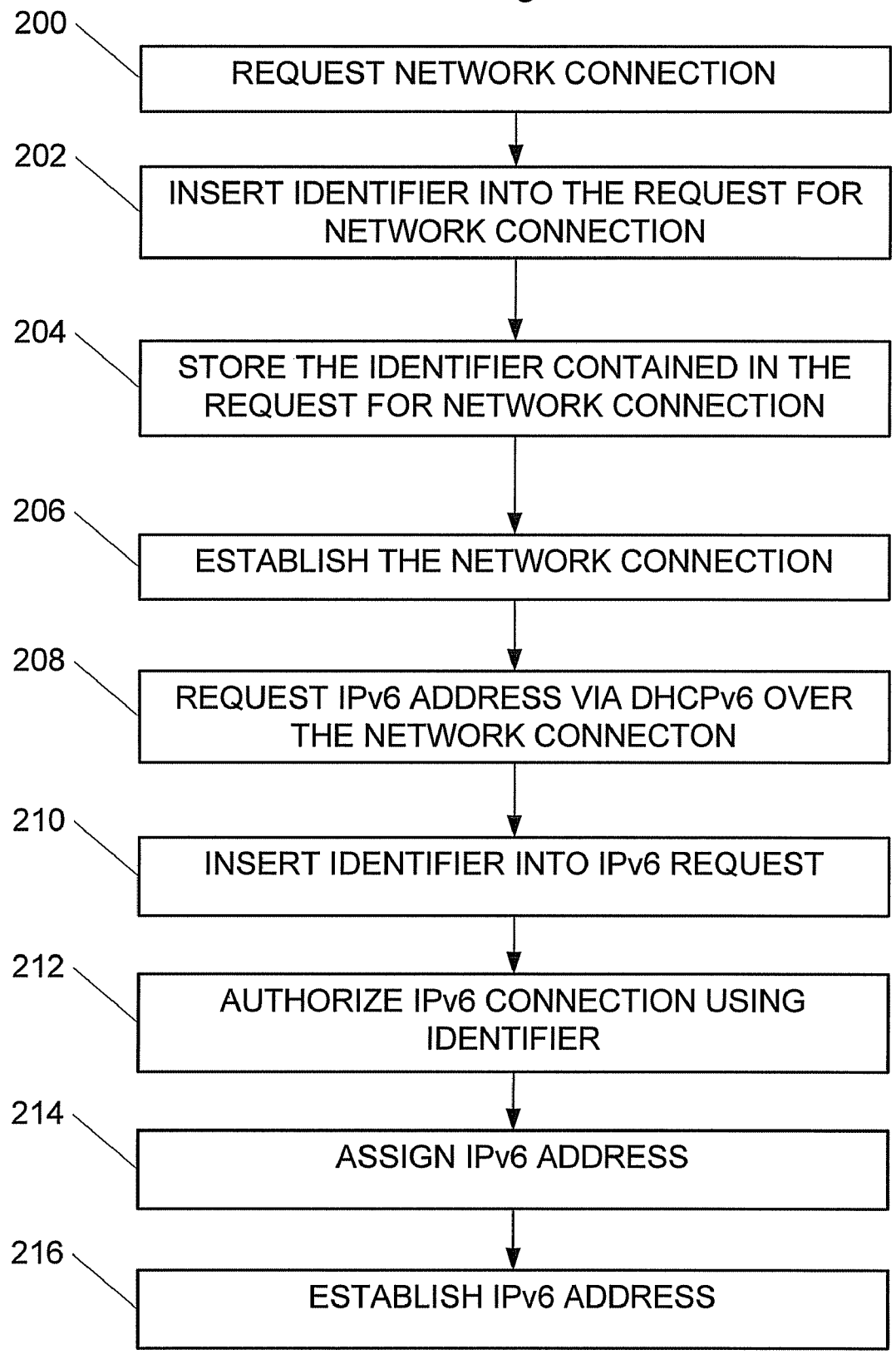

IPV6 ADDRESSING OVER NON-IPV6 SYSTEMS

TECHNICAL FIELD

The present disclosure generally relates to assigning an Internet protocol version 6 (IPv6) address to a client over a non-IPv6 system.

BACKGROUND

Client devices, such as customer-premises equipment, may be connected to a network through an Internet connection or other network connection. A non-IPv6 system may be implemented to allow a network connection to occur. However, clients desiring to obtain an Internet protocol version 6 (IPv6) address may encounter difficulty due to a system being non-IPv6 based.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 4 illustrates an example of a system configured to assign an IPv6 address through a point-to-point protocol over Ethernet system.

FIG. 5 illustrates an example of a method for establishing an IPv6 address.

DESCRIPTION OF EXAMPLE EMBODIMENTS

Overview

Figure 1:
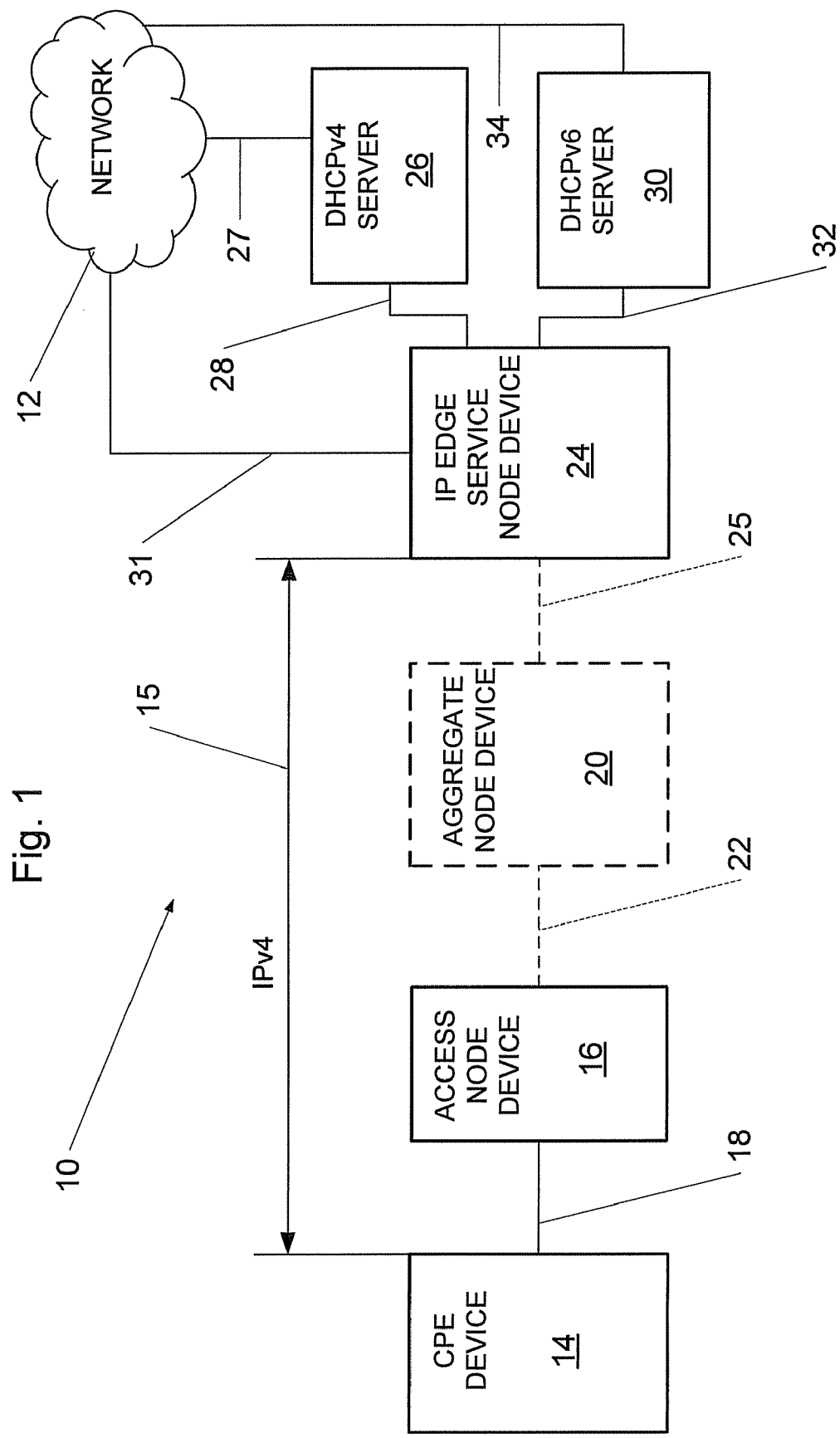
FIG. 1 illustrates one example embodiment of a system for assigning an Internet protocol version 6 (IPv6) address through a non-IPv6 system.

The present disclosure is defined by the following claims, and nothing in this section should be taken as a limitation on those claims. Further aspects and advantages of the disclosure are discussed below in conjunction with the example embodiments.

According to one aspect of the disclosure, an apparatus may include a memory and a processor in communication with the memory. The processor may be configured to receive a network connection request. The processor may be further configured to store an identifier contained in the network connection request. The processor may be further configured to insert the identifier into an Internet protocol version 6 (IPv6) address request according to dynamic host configuration protocol version 6 (DHCPv6) transmitted via a network connection established through the network connection request.

According to another aspect of the disclosure, a system may include an access node having an associated identifier. The access node may be configured to insert the identifier into a network connection request. The system may include an IP edge service node connected to the access node and configured to receive the network connection request. The IP edge service node may be further configured to store the inserted identifier and to insert the identifier into an Internet protocol version 6 (IPv6) address request according to DHCPv6 transmitted through an established network connection based on the network connection request. The system may further include a server configured to receive the IPv6 address request and assign an IPv6 address based on the IPv6 address request.

According to another aspect of the disclosure, logic may be encoded in one or more tangible media for execution. When executed, the logic may be operable to receive a network connection request. The logic, when executed, may be further operable to store an identifier contained in the network connection request. The logic, when executed, may be further operable to insert the stored identifier into an IP version 6 (IPv6) address request transmitted according to DHCPv6 via a network connection established via the network connection request. The logic, when executed, may be further operable to transmit an assigned IPv6 address via the network connection.

According to another aspect of the disclosure, a method may include receiving a network connection request. The method may further include storing an identifier contained in the network connection request. The method may further include inserting the identifier into a dynamic host configuration protocol version 6 (DHCPv6) Internet protocol version 6 (IPv6) address request transmitted via a network connection established through the network connection request.

A customer-premises equipment (CPE) device may be configured to request a network connection. An identifier may be inserted into the network connection request by an access node. The network connection request may be received by an IP edge service node and the identifier may be stored by the IP edge service node. The CPE device may request an Internet protocol version 6 (IPv6) address via dynamic host configuration protocol version 6 (DHCPv6) carried through the established network connection. The IP edge service node may insert the stored identifier into the IPv6 address request and complete a DHCPv6 exchange with a DHCPv6 server to cause an assignment of an IPv6 address. The identifier may provide identification of the CPE device or a location of the point of network connection of the CPE device so that the CPE device may receive an appropriate IPv6 address. The IPv6 address may be transmitted to the CPE device and the CPE device may be configured with the IPv6 address.

FIG. 1 illustrates one example of a system 10 included in a network 12. In one example, the network 12 may be a broadband network. The network 12 may include various services such as Internet services. A client may request an Internet protocol (IP) address in order to access the Internet. In one example, the client device may be a customer-premises equipment (CPE) device 14. The CPE device 14 may be one or more end-user components positioned on a customer side of a network, such as a router, personal computer or other suitable device. The CPE device 14 may be owned by a subscriber client or a provider of a particular service associated with the CPE device 14. The CPE device 14 may include one or more computer, processors, cards, or other now known or later developed computer network device.

In one example, the CPE device 14 may be connected to the network 12 through a number of devices. The CPE device 14 may be connected to an access node 16 through a connection 18. In one example, the access node 16 may be an outermost device on a network, such as the network 12, representing a switching point that is a point of end-user access to the network. The access node 16 may be connected to an aggregate node 20 through a connection 22. The aggregate node 20 may be connected to an Internet protocol (IP) edge node 24 through a connection 25. In one example, the access node 16 may be a layer-2 access node configured to operate on "Ethernet to the x" (ETTx), digital subscriber line (DSL), or worldwide interoperability for microwave access (WiMax). Each of the access node 16 and aggregate node 20 may be a network switch, such as an Ethernet switch, including one or more computers, processors, cards, or other now known or later developed devices suitable to perform network switching.

The IP edge service node 24 may be a broadband access server (BRAS), broadband network gateway (BNG), or any other suitable network device or devices. The IP edge service node 24 may be one or more computers, processors, cards, or other now known or later developed devices suitable to perform network functions.

In FIG. 1, the dashed lines associated with the aggregate node 20 represent that the aggregate node 20 may or may not be included in various systems 10. The absence of an aggregate node 20 may allow the access node 16 to be connected directly to the IP edge service node 24. The system 10 may also include a plurality of aggregate nodes 20, which may be connected between the access node 16 and the IP edge service node 24.

As shown in FIG. 1, in one example, the access node 16 and the aggregate node 20 may be physically configured to support Internet protocol version 4 (IPv4) as indicated by an arrow 15. A CPE device 14 may request an IPv4 address and an Internet protocol version 6 (IPv6) address separately through the system 10. The CPE device 14 may transmit a request for an IPv4 address according to dynamic host configuration protocol version 4 (DHCPv4). An IPv4 address request may traverse through the access node 16 and any aggregate nodes 20 prior to reaching the IP edge service node 24. The access node 16 and the aggregate node 20 may be configured to each, or in concert, perform snooping or relaying of IPv4 protocols, which may include snooping and insertion of information into a request for an IPv4 request. Snooping may ensure IP integrity.

The IPv4 address request may be received by the IP edge service node 24, which may act as a DHCPv4 relay agent. The IP edge service node 24 may perform a DHCPv4 relay exchange through a connection 28 in which a DHCPv4 server 26 verifies credentials included in a request to ensure the CPE device 14 is authorized to be connected to the network 12. The DHCPv4 server 26 may generate an IPv4 address to be transmitted back to the CPE device 14. The DHCPv4 server 26 may be connected to the network 12 through a connection 27.

The network 12 may also be configured to allow the CPE device 14 to request and receive an Internet protocol version 6 (IPv6) address via DHCP version 6 (DHCPv6). The system 10 may include a DHCPv6 server 30 to supply the IPv6 address across the devices configured to support IPv4. The DHCPv6 server 30 may be connected to the IP edge service node 24 through a connection 32 and may be connected to the network 12 through connection 34 as shown in FIG. 1. The IP edge service node 24 may be connected to the network through a connection 31. The system 10 may include a plurality of DHCPv4 and DHCPv6 servers. IPv4 and IPv6 address requests may be received by an appropriate server. The connections 18, 22, 25, 27, 28, 31, 32, 34 may be may be a single or series of network connections linking the devices to one another, such as in the manner described. Any computer network link or communications path may be used, such as direct or indirect linking.

Figure 2:
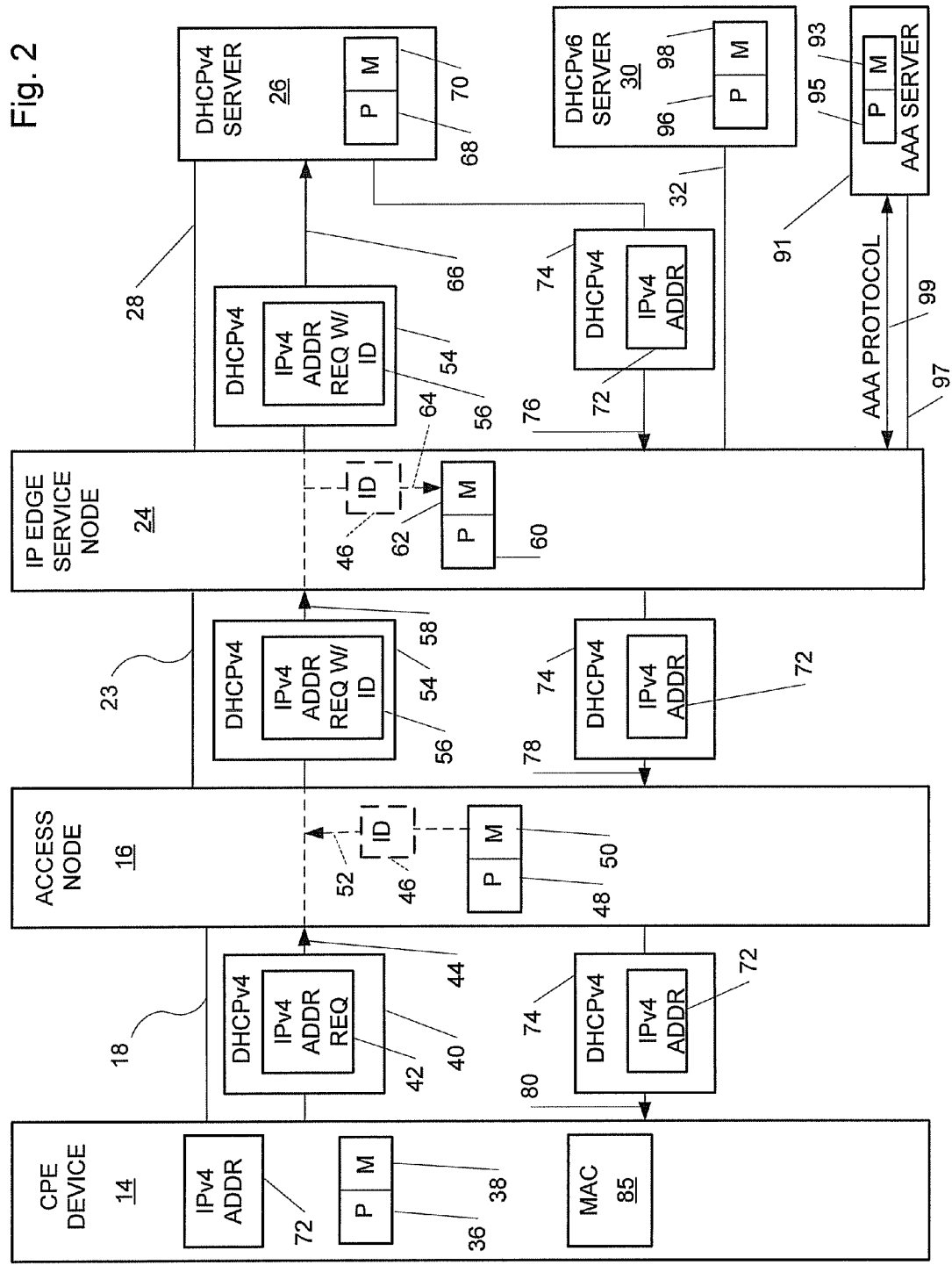
FIG. 2 illustrates an example of a system configured to assign an IPv6 address through an IP version 4 (IPv4) system.
Figure 3:
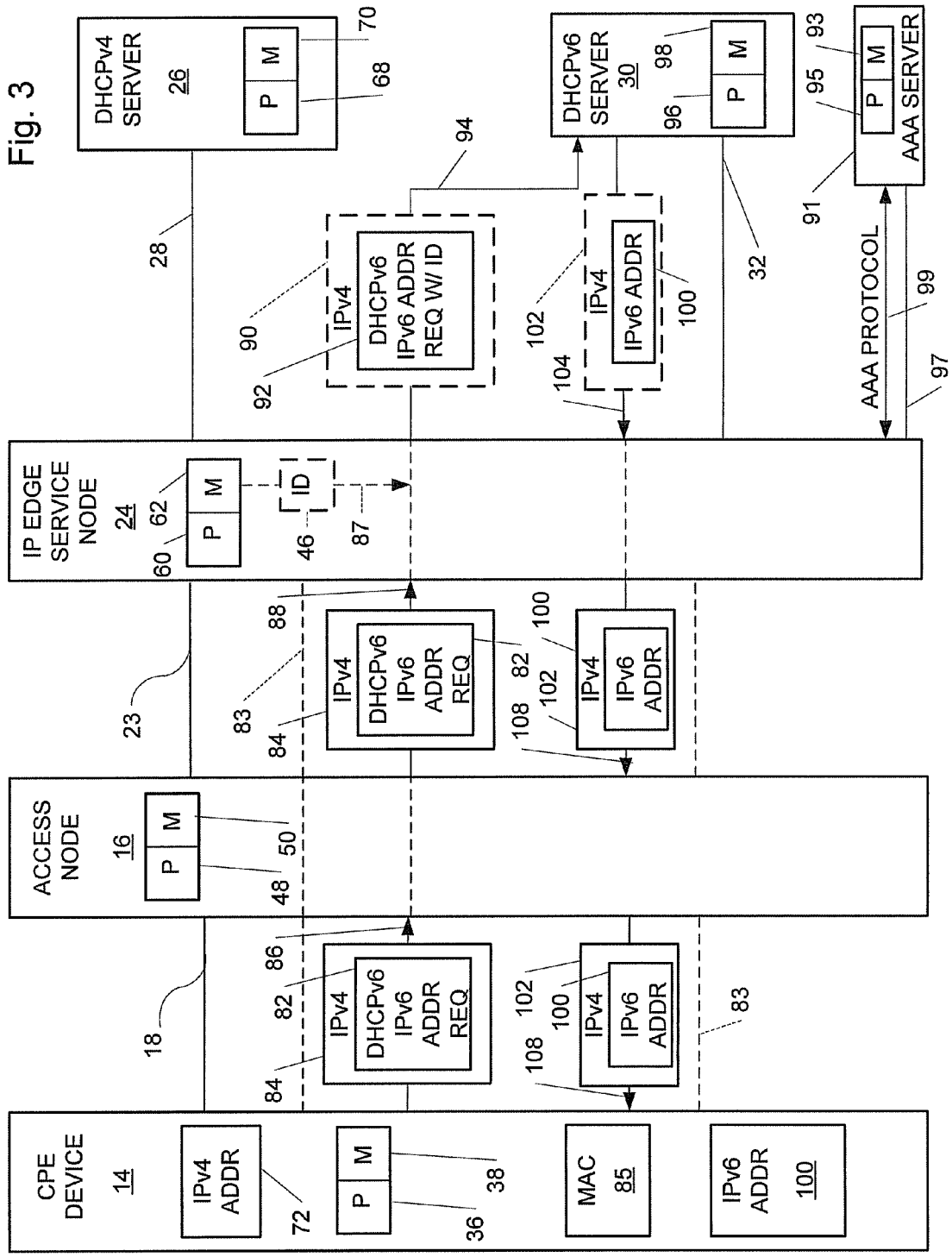
FIG. 3 illustrates an example of a system configured to assign an IPv6 address through an IPv4 system

In FIGS. 2 and 3, an example of the system 10 is shown, which may be configured to provide an IPv6 address to the CPE device 14. The example of system 10 shown in FIGS. 2 and 3 is shown as being configured without an aggregate node 20, however, it should be appreciated that one or more aggregate nodes 20 may be included in the system 10 as shown in FIGS. 2 and 3.

The CPE device 14 is shown as including a processor 36 and a memory 38. The processor 36 may generate a DHCPv4 data packet 40 including an IPv4 address request 42 transmitted through the connection 18 to the access node 16 as indicated by an arrow 44. In FIGS. 2 and 3, the access node 16 may be configured to store an identifier 46 associated with the connection 18. The identifier 46 may be data indicating a location in a network from which a request or other data packet originates. In one example, the connection 18 may be an access circuit associated with a broadband network. The identifier 46 may be an identifier associated with the access circuit. Access nodes connected to a particular access circuit may be configured to store the identifier. In another example, the identifier 46 may be a remote identification to associate the CPE device 14 with the access node 16.

The access node 16 may include a processor 48 and a memory 50. Once the data packet 40 is received by the access node 16, the processor 48 of the access node 16 may recall the identifier 46 from the memory 50 and include the identifier 46 into the data packet 40 as indicated by an arrow 52. The access node 16 may then transmit a data packet 54 containing a request 56 for an IPv4 address with the identifier 46 to the IP edge service node 24 through a connection 23 as indicated by an arrow 58.

The IP edge service node 24 may receive the data packet 54. The IP edge service node 24 may include a processor 60 and a memory 62. The processor 60 may be configured to determine the identifier 46 in the data packet 54 and store the identifier 46 in the memory 62, as indicated by an arrow 64, for further use as will be described. The IP edge service node 24 may act as a DHCPv4 relay agent in retrieving an IPv4 address 72.

The DHCPv4 server 26 may include a processor 68 and a memory 70. The memory 70 may include a number of IPv4 addresses. The processor 68 may receive the data packet 54 and transmit an IPv4 address 72 based on the IPv4 address request 56 during the DHCPv4 exchange. The identifier 46 allows the DHCPv4 server 26 to appropriately identify the IPv4 address to be assigned to the CPE device 14. As shown in FIG. 2, the IPv4 address 72 may be transmitted via a DHCPv4 data packet 74. The data packet 74 may be transmitted from the DHCPv4 server 26 to the IP edge service node 24 during the exchange as indicated by an arrow 76. The data packet 74 may then be transmitted from the IP edge service node 24 to the access node 16 as indicated by an arrow 78. The data packet 74 may then be transmitted from the access node 16 to the CPE device 14 as indicated by an arrow 80. The CPE device 14 may then process the data packet 74 with the processor 36 to establish the IPv4 connection. The IP edge service node 24, and access node 16, and any other intervening equipment that the DHCPv4 data packet traverses may store the assigned IPv4 address, identifier, and a media access control (MAC) address 85 of the CPE device 14.

Once the IPv4 address is established, the CPE device 14 may request an IPv6 address via DHCPv6. Due to the system 10 being configured for IPv4, IPv6 data may be tunneled over the IPv4 system. As shown in FIG. 3, the establishment of the IPv4 address 72 may allow a tunnel 83 to be established. The tunnel 83 may include the IPv4 address and a media access control (MAC) address 85 of the CPE device 14.

This configuration allows an IPv6 connection to be supported over a system configured for IPv4. Presence of the IPv4 tunnel 83 may cause the access node 16 to be shielded from recognizing the CPE device 14 during an IPv6 configuration. In one example, an IPv6 address request 82 according to DHCPv6 may be transmitted over the system 10 encapsulated by an IPv4 data packet 84 as shown in FIG. 3. The data packet 84 may be transmitted to the access node 16 through the connection 18 as indicated by an arrow 86. The data packet 84 may then be transmitted to the IP edge service node 24 through the connection 23 as indicated by an arrow 88. Upon receiving the data packet 84, the processor 60 of the IP edge service node 24 may recall and insert the identifier 46 into the IPv6 address request 82 as indicated by an arrow 87 to generate a request 92.

In one example, the IP edge service node 24 may construct a DHCPv6 relay option and insert the identifier 46 into the IPv6 request according to DHCPv6 as DHCPv6 Option 18. In an alternative example, the IP edge service node 24 may insert a tunnel interface ID associated with the tunnel 83 as DHCPv6 Option 18 and insert the identifier 46 as a different DHCPv6 option into the DHCPv6-based IPv6 address request 82. In another alternative example, the IP edge service node 24 may insert the identifier 46 into DHCPv6 Option 18 as a first DHCPv6 relay option. A DHCPv6 message will result, which allows the IP edge service node 24 to use the message as an input to another DHCPv6 relay operation, which converts the DHCPv6 message into a relay option, which is then transferred to the DHPCv6 for purposes of receiving the IPv6 address 100.

Upon inserting the identifier 46, the IP edge service node 24 may transmit an IPv4 data packet 90 that includes a DHCPv6-based IPv6 address request 92 that includes the identifier 46 to the DHCPv6 server 30 through the connection 32 as indicated by an arrow 94. The dashed line representing the IPv4 packet 92 indicates that the IPv4 packet 90 may be removed by the IP edge service node 24 prior to the request 92 being transmitted to the DHCPv6 server 30 using IPv6. Alternatively, the IPv4 packet 90 may remain until received by the DHCPv6 server 30, which may be configured to operate according to IPv4 allowing the DHCPv6 server 30 to appropriately process the IPv4 data packet 90.

An authentication, authorization, and accounting (AAA) server 91 may be used during triggering of the DHCPv6 solicitation to obtain an IPv6 address from the DHCPv6 server 30. The AAA server 91 may be connected to the IP edge service node 24 through a connection 97. In an alternative example, the AAA server 91 may be connected to one or both of the DHCPv4 server 26 and the DHCPv6 server 30. The AAA server 91 may include a processor 95 and a memory 93. The AAA server 91 may receive the identifier 46 stored in the memory 62 of the IP edge service node 24 as a credential to authorize the CPE device 14 for IPv6. The AAA server 91 may communicate with the IP edge service node 24 using an AAA protocol as indicated by an arrow 99.

Various AAA protocols may be used such as remote authentication dial in user service (RADIUS), Diameter, terminal access controller access-control system (TACACS), TACACS+, etc. Alternatively, the IP edge service node 24 may use the identifier 46 as a credential to internally authorize the CPE device 14 through an AAA protocol for IPv6 configuration via DHCPv6.

The DHCPv6 server 30 may include a processor 96 and a memory 98. Once the DHCPv6 server 30 receives the IPv6 address request 92 including the identifier 46, the DHCPv6 server 30 may process the DHCPv6 IPv6 address request 92 during the DHCPv6 exchange with the processor 96 to assign an IPv6 address stored in the memory 98. The assigned IPv6 address 100 may then be transmitted to the IP edge service node 24 through the connection 23 as indicated by an arrow 104. The DHCPv6 server 30 may encapsulate the IPv6 address 100 in an IPv4 data packet 102. The dashed line representing the data packet 102 indicates that, alternatively, the IPv6 address 100 may be encapsulated once it is received by the IP edge service node 24. The IP edge service node 24 may transmit the data packet 102 to the access node 16 through the tunnel 83. The access node 16 may then transmit the data packet 102 to the CPE device 14. The CPE device 14 may process the data packet 102 and configure the IPv6 address 100.

In alternative examples, the system 10 may include other manners of authorizing the CPE device 14 to receive an IPv6 address. In one example, the IP edge node 24 may offer a randomly-generated value of a predetermined length, such as 128 bits. This value may be echoed back during the DHCPv4 exchange, such as when the IP edge service node 24 transmits the data packet to the DHCPv4 server 26 and receives the IPv4 address 72 from the DHCPv4 server 26. In this example, the CPE device 14 may be a managed CPE device. The randomly-generated value may be used to mitigate spoofing attacks by a rogue DHCPv6 client. The randomly generated value may also be used in a system 10 configuration in which the source IPv4 or MAC address of the tunnel 83 vary due to appropriate operating conditions. In another example, the DHCPv6 exchange may be associated with the DHCPv4 exchange using an echoed cookie from the CPE device 14, or a configuration option common to both the DHCPv4 and DHCPv6 exchange, such as a client identifier of the CPE device 14.

In alternative examples, an IPv4-address may be assigned to a CPE device over a previously-established IPv6 connection using a configuration similar to that shown in FIGS. 2 and 3. In one example, an IPv4 address may be assigned over an IPv6 tunnel. An identifier may be stored by the IP edge service node 24 contained in an IPv6 address request. The identifier may be inserted into an IPv4 address request being transmitted over DHCPv4. In one example, the identifier may be inserted into an IPv4 address request over DHCPv4 Option 82. The DHCPv4 server 26 may assign an IPv4 address. The IPv4 address may be assigned back to the CPE device 14 through an IPv6 tunnel.

FIG. 4 shows another example of a system 106 that may be configured to provide an IPv6 address to the CPE device 14. In the example of FIG. 4, the system 106 may be configured to provide an IPv6 address to the CPE device 14 using a point-to-point protocol over Ethernet (PPPoE). In FIG. 4, the CPE device 14 may connect with the IP edge service node 24. During a PPPoE transaction 108, the establishment of the connection with the IP edge service node device 24 will pass through the access node 16. An identifier 110 may be provided to the PPPoE transaction 108, such as a PPPoE tag, or other identifier, by the access node 16 in a similar manner as that described in regard to FIGS. 2 and 3. At the IP edge service node device 24, the identifier 110 may be retrieved from the PPPoE transaction 108 by the processor 60 and stored in the memory 62.

Upon establishment of the PPPoE connection, a DHCPv6 via IPv6 request 112 may be generated by the CPE device 14. The IPv6 may be transmitted over a PPPoE tunnel 114 established based upon the PPPoE connection made with the IP edge service node device 24. As similarly described in regard to FIGS. 2 and 3, the access node 16 may be shielded from recognizing the DHCPv6 request 112 due to the PPPoE tunnel 114. Thus, upon reaching the IP edge service node device 24, the identifier 110 may be inserted into the DHCPv6 request, which allows authentication of the CPE device 14 by the DHCPv6 server 30. Upon authentication an IPv6 address may be passed back through the system 108 through the PPPoE tunnel 114 to the CPE device 14, allowing establishment of the IPv6 connection.

FIG. 5 shows a method of establishing an IPv6 address on a non-IPv6 system. In one example, the method may include an act 200 of requesting a network connection. In one example, the act 200 may be performed by a CPE device such as the CPE device 14, which may request an IPv4 address or a PPPoE connection. The CPE device may generate the network request.

The method may also include an act 202 of storing an identifier in the network connection request. In one example, the act 202 may be performed by an access node, such as the access node 16 in FIGS. 2, 3, and 4. In one example, the access node 16 may insert an access line identification or a remote identification into the network connection request, such as a DHCPv4-based IPv4 request. In another example, the access node 16 may insert a PPPoE tag into the network connection request.

The method may also include an act 204 of storing the identifier contained in the request for network connection. In one example, the act 204 may be performed by an IP edge service node device, such as the IP edge service node device 24 in FIGS. 2, 3, and 4.

The method may also include an act 206 of establishing a network connection, such as an Internet connection or a PPPoE connection, for example. The method may also include an act 208 of requesting an IPv6 address via DHCPv6 over a network connection. In one example, the act 208 may be performed by a CPE device, such as the CPE device 14 in FIGS. 2, 3, and 4. The CPE device 14 may request the IPv6 address over an IPv4 or other current network connection.

The method may also include an act 210 of inserting the identifier into the IPv6 request. In one example, the act 210 may be performed with an IP edge service node device, such as that described in FIGS. 2, 3, and 4. The IP edge service node device 24 may insert the stored identifier into the IPv6 request. The method may further include an act 212 of authorizing an IPv6 connection using the identifier. In one example, the act 212 may be performed by a DHCPv6 server, such as the server 30, which may receive the IPv6 request and perform authorization using the identifier as a basis for authorization.

The method may also include an act 214 of assigning an IPv6 address. In one example, a DHCPv6 server, such as the server 30 may assign an IPv6 address after authorization is complete. The method may further include an act 216 of establishing an IPv6 address. In one example, the act 216 may be performed by transmitting the IPv6 back to a requesting device, such as the CPE device 14. The IPv6 may be sent back via a tunnel based on the previously established network connection, such as IPv4 or PPPoE. The CPE device 14 may then operate over IPv6 once establishment has taken place.

The memory 38, 50, 62, 70, 93, 98 is additionally or alternatively a computer-readable storage medium with processing instructions. Data representing instructions executable by the programmed processors 36, 48, 60, 68, 95, 96 is provided establishing an IPv6 connection for a CPE device. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

In one example, the method 200 may be performed through logic encoded on at least one memory 38, 50, 62, 70, 93, 98 and executed on at least one of the associated processors 36, 48, 60, 68, 95, 96 described according to FIGS. 2, 3, and 4. In one example, a CPE device may establish an IPv6 connection according to the method 200 through logic encoded on each memory 38, 50, 62, 70, 93, 98 and executed by the processors 36, 48, 60, 68, 95, 96. Logic encoded in one or more tangible media for execution is defined as the instructions that are executable by a programmed processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. An apparatus comprising:
a memory; and
a processor in communication with the memory, the processor configured to:
receive an identifier included in a non-Internet protocol version 6 (Ipv6) network connection request to establish a non-Ipv6 network connection with a customer-premises equipment (CPE) device;
store the identifier; receive an Ipv6 address request from the CPE device, the Ipv6 address request being a request to configure the CPE device to establish an Ipv6 network connection with the CPE device, the Ipv6 address request being transmitted according to dynamic host configuration protocol version 6 (DHCPv6) over the non-Ipv6 network connection established through the non-Ipv6 network connection request;
insert the identifier included in the non-Ipv6 network connection request into the Ipv6 address request, the identifier being inserted into the Ipv6 address request to configure the CPE device to establish the Ipv6 network connection with the CPE device, and
wherein the apparatus further configured to: receive an assigned Ipv6 address via a network connection from a DHCPv6 server and transmit the assigned Ipv6 address via the non-Ipv6 network connection to the customer-premises equipment device.

2. The apparatus of claim 1, wherein the identifier is an access line identification associated with an access line circuit.

3. The apparatus of claim 1, wherein the non-Ipv6 network connection request is a Internet protocol version 4 (Ipv4) address request according to dynamic host configuration protocol version 4 (DHCPv4).

4. The apparatus of claim 1, wherein the non-Ipv6 network connection request is a point-to-point protocol over Ethernet (PPPoE) request.

5. The apparatus of claim 4, wherein the identifier is a PPPoE tag.

6. The apparatus of claim 1, wherein the processor is further configured to transmit the Ipv6 address request to the DHCPv6 server in response to receipt of the Ipv6 address request from over the non-Ipv6 network connection.

7. The apparatus of claim 1, wherein the processor is configured to insert the identifier into the Ipv6 address request in accordance with a DHCPv6 relay option.

8. A system comprising:
an access node having an associated identifier, the access node configured to insert the identifier into a non-Internet protocol version 6 (Ipv6) network connection request to establish a non-Ipv6 connection with a customer-premises equipment (CPE) device;
an IP edge service node connected to the access node and configured to:
receive the non-Ipv6 network connection request including the identifier, store the inserted identifier, receive an Ipv6 address request transmitted from the CPE device to configure the CPE device to establish an Ipv6 network connection with the CPE device, the Ipv6 address request being transmitted according to dynamic host configuration protocol version 6 (DHCPv6) through the non-Ipv6 established network connection based on the non-IPv6 network connection request, and
insert the identifier included in the non-Ipv6 network connection request into the Ipv6 address request, the identifier being inserted into the Ipv6 address request to configure the CPE device to establish the Ipv6 network connection with the CPE device; and a server configured to receive the Ipv6 address request transmitted according to DHCPv6 and assign an Ipv6 address based on the Ipv6 address request transmitted according to DHCPv6.

9. The system of claim 8, wherein the access node is connected to an access line circuit and the identifier is an access line identification associated with the access line circuit.

10. The system of claim 8, wherein the non-Ipv6 network connection request is a dynamic host configuration protocol version 4 (DHCPv4) Internet protocol version 4 (Ipv4) address request.

11. The system of claim 10, wherein the IP edge service node is configured to receive the Ipv6 address request through an Ipv4 tunnel.

12. The system of claim 8, wherein the IP edge service node is further configured to perform an authentication, authorization, and accounting (AAA) authorization via an AAA protocol of the CPE device configured to transmit the Ipv6 address request according to DHCPv6.

13. The system of claim 8, wherein the non-Ipv6 network connection request is a point-to-point protocol over Ethernet (PPPoE) request.

14. The system of claim 8, wherein the Ipv6 address request with the inserted identifier comprises a relay option to cause the server to return an Ipv6 address.

15. A non-transitory computer-readable medium comprising a plurality of instructions executable by a processor, the computer-readable medium comprising:

instructions to receive a non-Internet protocol version 6 (Ipv6) network connection request to establish a non-Ipv6 network connection with a customer-premises equipment (CPE) device;
instructions to store an identifier contained in the non-Ipv6 network connection request;
instructions to receive an Ipv6 address request from the CPE device to configure the CPE device to establish an Ipv6 network connection with the CPE device, the Ipv6 address request being transmitted according to dynamic host configuration protocol version 6 (DHCPv6) via the non-Ipv6 network connection established via the non-Ipv6 network connection request;
instructions to insert the stored identifier included in the non-Ipv6 network connection request into the Ipv6 address request, the identifier being inserted into the Ipv6 address request to configure the CPE device to establish the Ipv6 connection with the CPE device; and
instructions to transmit an assigned IPv6 address via the non-IPv6 network connection to the CPE device.

16. The non-transitory computer-readable medium of claim 15 further comprising:
instructions to receive an Internet protocol version 4 (Ipv4) address request according to dynamic host configuration protocol version 4 (DHCPv4); and
instructions to store the identifier contained in the Internet protocol version 4 (Ipv4) address request.

17. The non-transitory computer-readable medium of claim 16 further comprising instructions to receive the Ipv6 address from a DHCPv6 server.

18. The non-transitory computer-readable medium of claim 17 further comprising: instructions to transmit the Ipv6 address to a customer-premises equipment device.

19. The non-transitory computer-readable medium of claim 15 further comprising:
instructions to receive a point-to-point protocol over Ethernet (PPPoE) connection request; and
instructions to store an identifier contained in the point-to-point protocol over Ethernet (PPPoE) connection request.

20. A method comprising: receiving a non-Internet protocol version 6 (Ipv6) network connection request to establish a non-Ipv6 network connection with a device, the non-Ipv6 network connection request including an identifier;
receiving an Ipv6 network connection request from the device to configure the device to establish an Ipv6 network connection with the device, the Ipv6 network connection request being transmitted via the non-Ipv6 network connection established with the device through the non-Ipv6 network connection request;
inserting the identifier included in the non-Ipv6 network connection request into the Ipv6 address request to configure the device to establish the Ipv6 network connection with the device;
receiving an Ipv6 address from a DHCPv6 server; and
transmitting the Ipv6 address over the established non-Ipv6 network connection to the device.

21. The method of claim 20, wherein:
receiving the non-Ipv6 network connection comprises receiving an Internet protocol version 4 (Ipv4) address request according to dynamic host configuration protocol version 4 (DHCPv4); wherein the method further comprises:
storing the identifier contained in the Internet protocol version 4 (Ipv4) address request.

* * * * *